(12) United States Patent
Henry (10) Patent No.: US 8,153,218 B2
(45) Date of Patent: Apr. 10, 2012

(54) HOSE ASSEMBLY HAVING VARIED REINFORCING LAYERS

(75) Inventor: Brian Henry, Sun Prairie, WI (US)

(73) Assignee: Veyance Technologies, Inc., Fairlawn, OH (US)

( * ) Notice: Subject to any disclaimer, the term of this patent is extended or adjusted under 35 U.S.C. 154(b) by 1003 days.

(21) Appl. No.: 12/118,993

(22) Filed: May 12, 2008

(65) Prior Publication Data

US 2008/0210328 A1  Sep. 4, 2008

Related U.S. Application Data

(63) Continuation-in-part of application No. 10/738,483, filed on Dec. 17, 2003, now abandoned.

(51) Int. Cl.
*B32B 1/08* (2006.01)
*B32B 23/00* (2006.01)

(52) U.S. Cl. .............. 428/36.91; 428/34.1; 428/34.2; 428/35.7; 428/35.9; 428/36.9; 138/118; 138/123; 138/124; 138/125; 138/126

(58) Field of Classification Search ........... 428/34.1, 428/34.2, 35.7, 35.9, 36.9; 138/118, 123, 138/124, 125, 126
See application file for complete search history.

(56) References Cited

U.S. PATENT DOCUMENTS

| | | | |
|---|---|---|---|
| 3,011,525 A | 12/1961 | Charles et al. |
| 3,725,167 A | 4/1973 | Hunt et al. |
| 3,750,712 A | 8/1973 | Brand |
| 3,856,052 A | 12/1974 | Feucht |
| 4,111,237 A | 9/1978 | Mutzner et al. |
| 4,266,461 A | 5/1981 | Molitors |
| 4,273,160 A | 6/1981 | Lowles |
| 4,420,018 A | 12/1983 | Brown |
| 4,431,031 A | 2/1984 | Ettlinger |
| 4,553,568 A | 11/1985 | Piccoli et al. |
| 4,585,035 A | 4/1986 | Piccoli |
| 4,604,155 A | 8/1986 | McKiernan |
| 4,662,405 A | 5/1987 | Besche et al. |
| 4,699,178 A | 10/1987 | Washkewicz et al. |
| 4,754,685 A | 7/1988 | Kite et al. |
| 4,802,510 A | 2/1989 | Berlincourt et al. |
| 4,907,624 A | 3/1990 | Jonasson |
| 4,952,262 A | 8/1990 | Washkewicz et al. |
| 5,099,744 A | 3/1992 | Hurst et al. |

(Continued)

FOREIGN PATENT DOCUMENTS

EP 0696700 A1 2/1996

OTHER PUBLICATIONS

U.S. Patent and Trademark Office, Office Action dated as mailed on Feb. 5, 2009 for related U.S. Appl. No. 10/738,483, 7 pages.

(Continued)

*Primary Examiner* — Marc Patterson
(74) *Attorney, Agent, or Firm* — Alvin T. Rockhill; Kathleen K. Bowen (57) ABSTRACT

A hydraulic brake hose assembly has a core hose layer, a first reinforcing layer over the core hose layer, an intermediate hose layer, a second reinforcing layer over the intermediate hose layer, and an outer hose layer over the second reinforcing layer. The first reinforcing layer has a braid pattern formed in a 4-over, 4-under pattern, and the second reinforcing layer has a braid pattern formed in a 3-over, 3-under pattern.

20 Claims, 7 Drawing Sheets

U.S. PATENT DOCUMENTS

| | | | |
|---|---|---|---|
| 5,268,134 | A | 12/1993 | Burlett et al. |
| 5,445,191 | A | 8/1995 | Green et al. |
| 5,775,195 | A | 7/1998 | Haehnel et al. |
| 5,803,129 | A | 9/1998 | Coronado et al. |
| 6,068,026 | A | 5/2000 | Garois |
| 6,179,007 | B1 | 1/2001 | Cote |
| 6,450,206 | B2 | 9/2002 | Ishikawa et al. |
| 6,648,023 | B2 | 11/2003 | Nakakita et al. |
| 6,926,038 | B1 | 8/2005 | Cook et al. |
| 6,978,805 | B2 | 12/2005 | D'Amico |
| 6,988,515 | B2 | 1/2006 | Oishi et al. |
| 7,021,339 | B2 | 4/2006 | Hagiwara et al. |
| 2005/0136203 | A1 | 6/2005 | Henry |

OTHER PUBLICATIONS

Office Action issued in related U.S. Appl. No. 12/186,178; dated as mailed on Feb. 23, 2009; 8 pages; USPTO.

SAE International, "Surface Vehicle Standard", technical standards report, revised Jun. 2003, 18 pages.

Gary Mennig, Hose Having a Single Reinforcing Layer, U.S. Appl. No. 12/186,178, filed Aug. 5, 2008.

HOSE ASSEMBLY HAVING VARIED REINFORCING LAYERS

CROSS-REFERENCE

This application is a continuation-in-part of U.S. Ser. No. 10/738,483, the disclosure of which is hereby incorporated herein by reference in its entirety.

TECHNICAL FIELD

The present invention relates generally to hose assemblies, and more particularly to braided, reinforced hydraulic brake hose.

BACKGROUND

Reinforced hydraulic hose is well known in industry for use in transporting fluids under pressure, particularly in automotive brake hose applications. These hose assemblies generally comprise a polymeric core hose layer and one or more reinforcing layers formed from strands of fiber or wire material that are braided over the core layer. In most applications, the hose also includes an intermediate hose layer formed over the core hose layer and a first reinforcing layer. A second reinforcing layer is thereafter braided over the intermediate hose layer. Finally, a polymeric cover material is generally formed over the second reinforcing layer to complete the hose assembly.

The reinforcing layers of conventional hydraulic hose assemblies are generally applied by rotary braiding machines such as those described in U.S. Pat. Nos. 4,266,461; 5,099,744; and 5,775,195. Using these rotary braiding machines, strands of fiber or wire reinforcing material are wound upon the hose layers in an interwoven, braided pattern, as known in the art. Generally, the rotary braiding machines are configured to provide a braid pattern wherein the strands are successively passed over and under pairs of oppositely wound strands. This is referred to herein as a 2-over, 2-under braid pattern. In certain applications, it may be desired to further improve hose performance by varying the braid patterns, for example, to optimize burst strength, volumetric expansion, dynamic life, or coupleability of the hoses.

There is thus a need for a hydraulic brake hose which can be formed with reinforcing layers having braid patterns other than the standard 2-over, 2-under braid pattern in both reinforcing layers.

SUMMARY

The present invention provides a hydraulic brake hose having reinforcing layers formed in braid patterns other than conventional 2-over, 2-under patterns in each layer. In one embodiment, the brake hose comprises a core hose layer, a first reinforcing layer over the core hose layer, an intermediate hose layer over the first reinforcing layer, a second reinforcing layer over the intermediate layer, and an outer hose layer. The first reinforcing layer has a braid pattern formed in a 4-over, 4-under pattern, and the second reinforcing layer has a braid pattern formed in a 3-over, 3-under pattern. The reinforcing layers may comprise fiber or wire material.

In another embodiment, the core hose layer has an internal diameter of about 5/32" and the outer hose layer has an outer diameter from about 0.396" (10 mm) to about 0.433" (11 mm). The volumetric expansion of the hydraulic brake hose may be less than about 0.0975 cc/ft at 1000 psi. At 1500 psi, the volumetric expansion may be less than about 0.13 cc/ft, and at 2900 psi, the volumetric expansion may be less than about 0.295 cc/ft.

These and other features, objects and advantages of the invention will become more readily apparent to those skilled in the art upon review of the following detailed description, taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
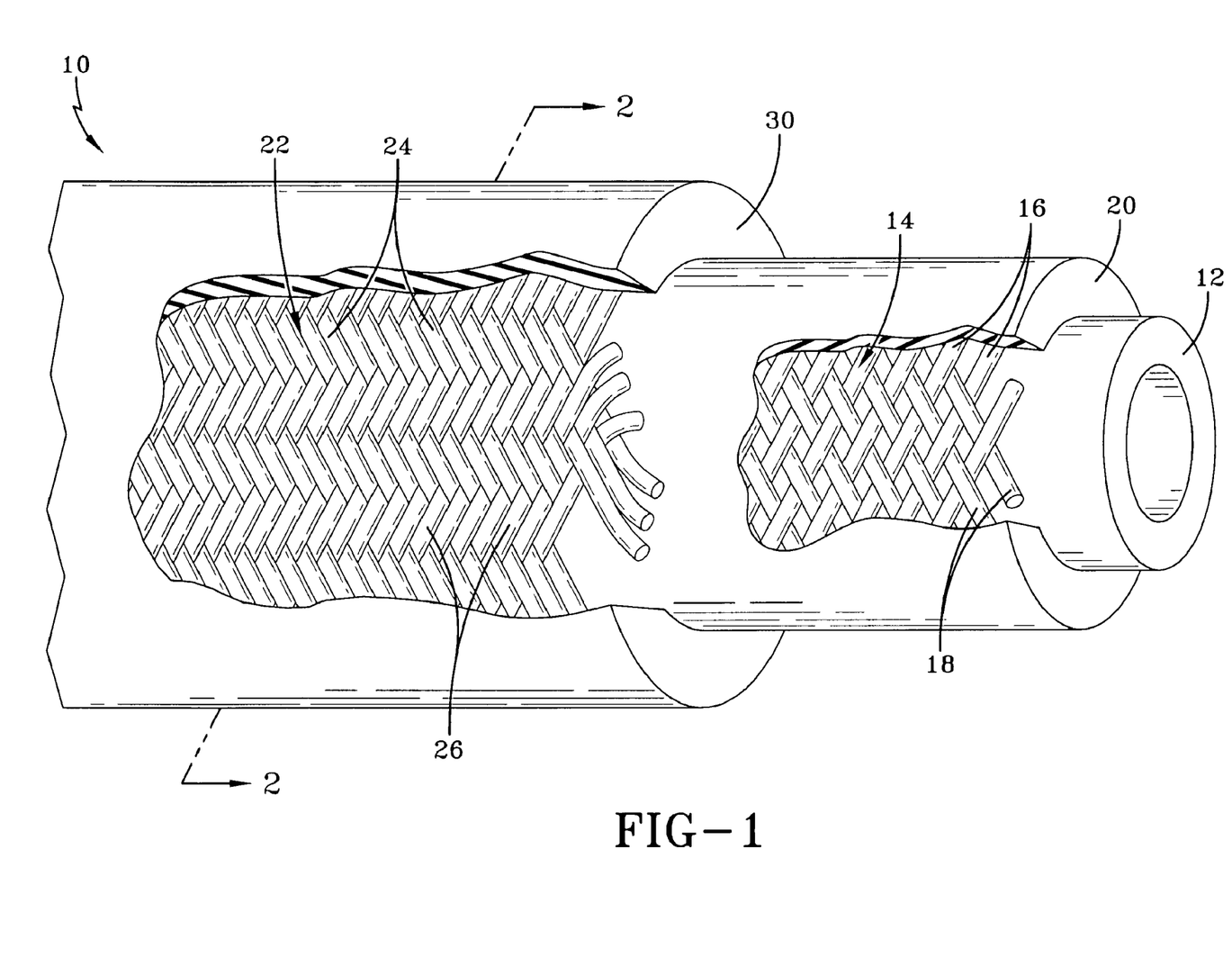
FIG. 1 is a perspective view depicting an exemplary hose assembly according to one embodiment.
Figure 2:
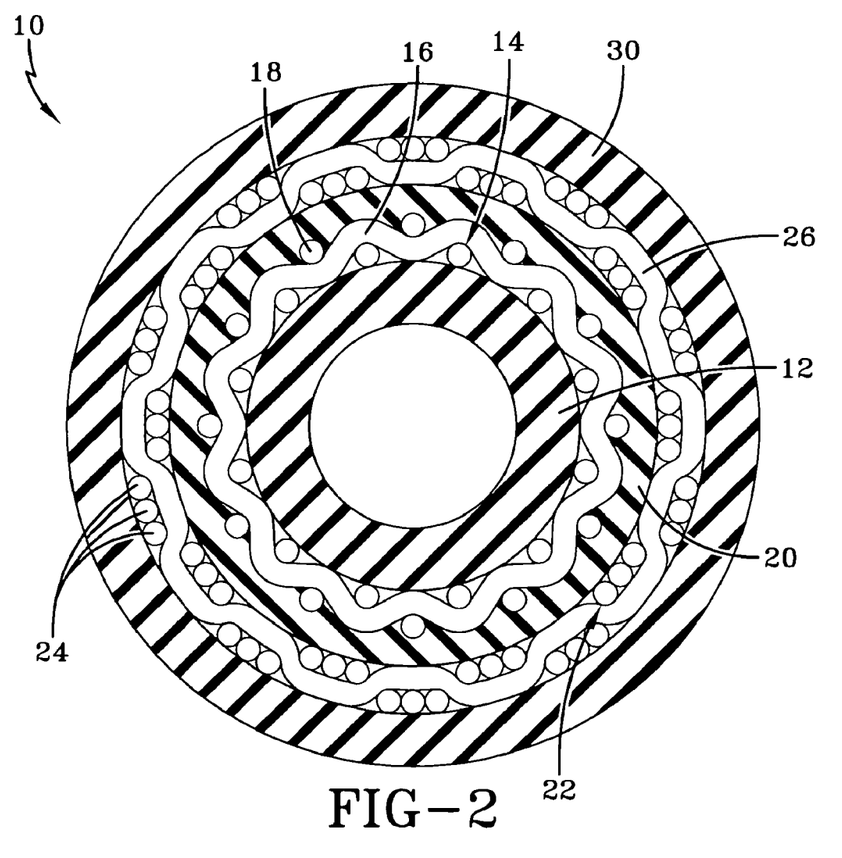
FIG. 2 is a cross-sectional view of the hose assembly of FIG. 1, taken along line 2-2.

Referring to FIGS. 1 and 2, there is shown an exemplary hydraulic brake hose assembly 10 according to the present invention. The hose assembly 10 includes a core hose layer or tube 12 formed from polymeric material that is suitable for use in transporting a fluid material for which the hose is intended to be used. As non-limiting examples, the polymeric material may comprise polychloroprene, chlorinated polyethylene acrylonitrile-budtadiene, styrene butadiene, polyisoprene, polybutadiene, ethylene-propylene-diene terpolymers, chlorinated polyethylene, or natural rubber polymers. Alternatively, the polymeric material may comprise thermoplastic elastomers such as propylene modified with ethylene-propylene rubber, such as Santoprene® available from Monsanto Corporation; block polymers, such as the Kraton® line of polymers available from Shell Chemical Company; polyvinyl chloride, etc. These elastomers may be compounded with other filler, plasticizers, antioxidants, and cure systems to achieve particular properties desired for a given application, as known in the art.

A first reinforcing layer 14 is formed over the core hose layer and comprises a plurality of first and second reinforcing members 16, 18 wound in opposite directions around and along the length of the core hose layer 12 in a braided pattern by a rotary braiding machine, as known in the art. The reinforcing members 16, 18 may comprise strands of fiber material, such as cotton, rayon, polyester, polyvinyl alcohol, or other suitable fiber material. Alternatively, the reinforcing members 16, 18 may comprise strands of metallic material in the form of wire. In the embodiment shown in FIG. 1, the first and second reinforcing members 16, 18 of the first reinforcing layer 14 are braided in a pattern such that each first reinforcing member 16 crosses over an oppositely wound second reinforcing member 18, then passes under an adjacent, oppositely wound reinforcing member 18 in succession. This braid pattern is referred to herein as a 1-over, 1-under braid pattern.

The hose assembly 10, further includes an intermediate hose layer 20 formed over the first reinforcing layer 14, generally by extruding the intermediate hose layer 20 over the core hose layer 12 and first reinforcing layer 14. A second reinforcing layer 22 is then formed over the intermediate hose layer 20 and has first and second reinforcing members 24, 26 wound around and along the intermediate hose layer 20 in opposite directions, in the manner described above for the first reinforcing layer 14. In the embodiment shown in FIG. 1, the second reinforcing layer 22 is braided such that each first reinforcing member 24 passes successively over and under three of the oppositely wound second reinforcing members 26. This braid pattern is referred to herein as a 3-over, 3-under braid pattern.

The hose assembly 10 may further include an outer hose layer 30 formed over the second reinforcing layer 22, generally by extruding the outer layer 30 over the second reinforcing layer 22. The outer hose layer 30 protects the hose assembly 10 and is formed from a polymeric material suited for use in an application for which the hose assembly 10 will be used. As a non-limiting example, the outer hose layer may be formed from any of the various polymeric materials described above for the core hose layer 12.

Figure 3:
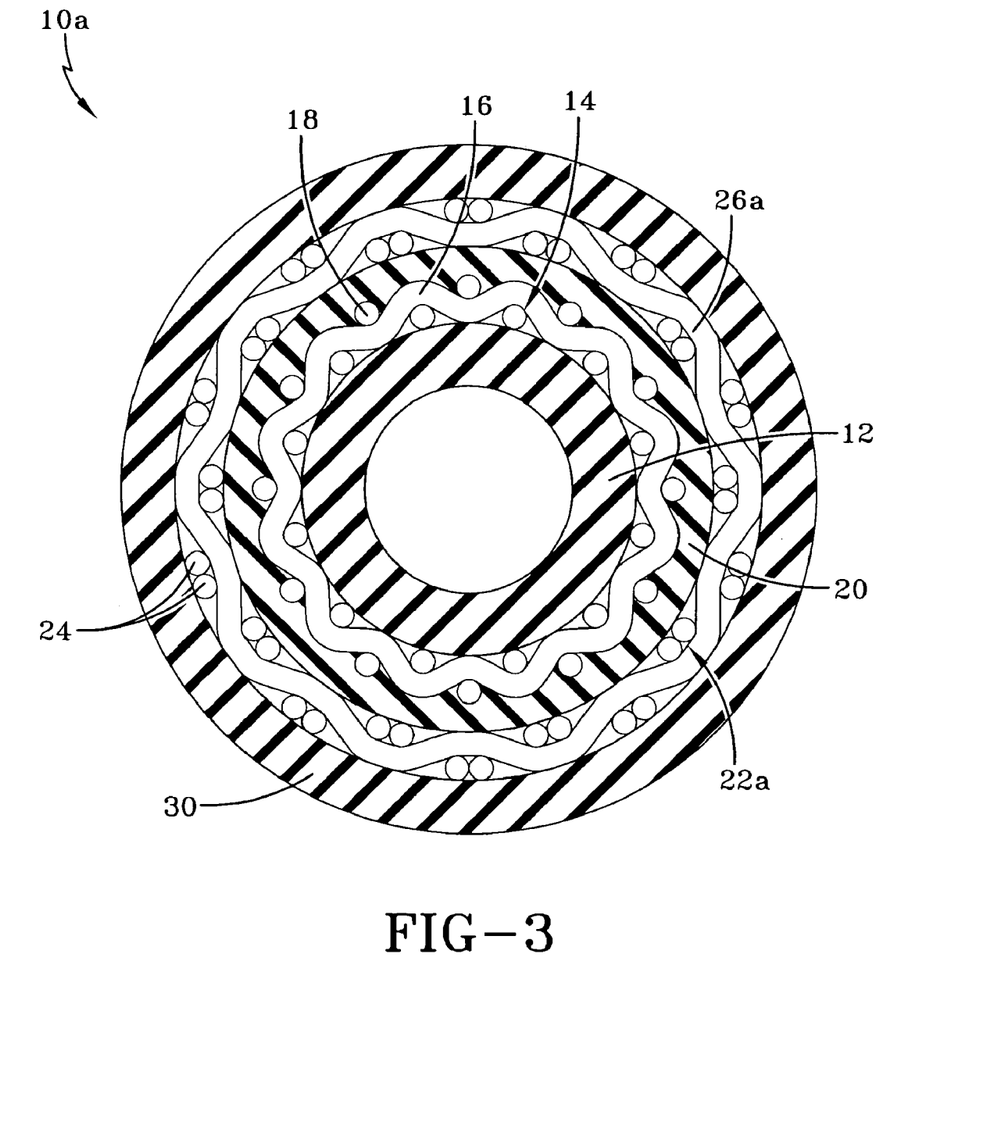
FIG. 3 is a cross-sectional view, similar to FIG. 2, depicting an alternate embodiment of a hose assembly.

While the exemplary hose assembly 10 of FIGS. 1 and 2 has been shown and described herein as having a first reinforcing layer 14 with a 1-over, 1-under braid pattern, and a second reinforcing layer 22 with a 3-over, 3-under braid pattern, it will be recognized that either the first or second reinforcing layers 14, 22 may alternatively be formed with a conventional 2-over, 2-under braid pattern. For example, FIG. 3 depicts a cross-section of an alternative hose assembly 10*a* wherein the first reinforcing layer 14 has a 1-over, 1-under braid pattern and the second reinforcing layer 22*a* has a 2-over, 2-under pattern. In another embodiment, the first and second reinforcing layers 14, 22 can have braid patterns selected from one of a 1-over, 1-under pattern; a 2-over, 2-under pattern; or a 3-over, 3-under pattern. There may also be embodiments in which the first reinforcing layer 14 and/or second reinforcing layer 22 includes a 4-over, 4-under braid pattern, as will be described in greater detail below. Accordingly, the braid patterns for the first and second reinforcing layers 14, 22 may be selected to have any of these braid patterns whereby various combinations of first and second reinforcing layer braid patterns may be produced.

Figure 1A:
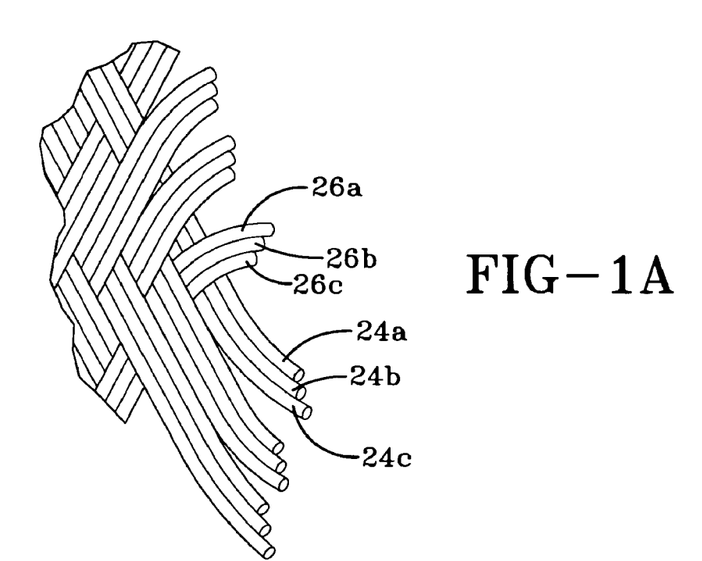
FIG. 1A is an alternative embodiment of an exemplary hose assembly similar the hose assembly of FIG. 1.

FIGS. 1-3 depict hose assemblies wherein the reinforcing members 16, 18, 24, 26 of the first and second reinforcing layers 14, 22 comprise single strands of fiber or wire material. Alternatively, each reinforcing member 16, 18, 24, 26 may comprise a plurality of strands, as known in the art. For example, FIG. 1A is a detail view of a 3-over, 3-under braid pattern similar to the second reinforcing layer 22 of hose assembly 10 in FIG. 1., but wherein each of the first and second reinforcing members 24, 26 comprise three strands of fiber or wire material 24*a*, 24*b*, 24*c* and 26*a*, 26*b*, 26*c*.

Figure 4:
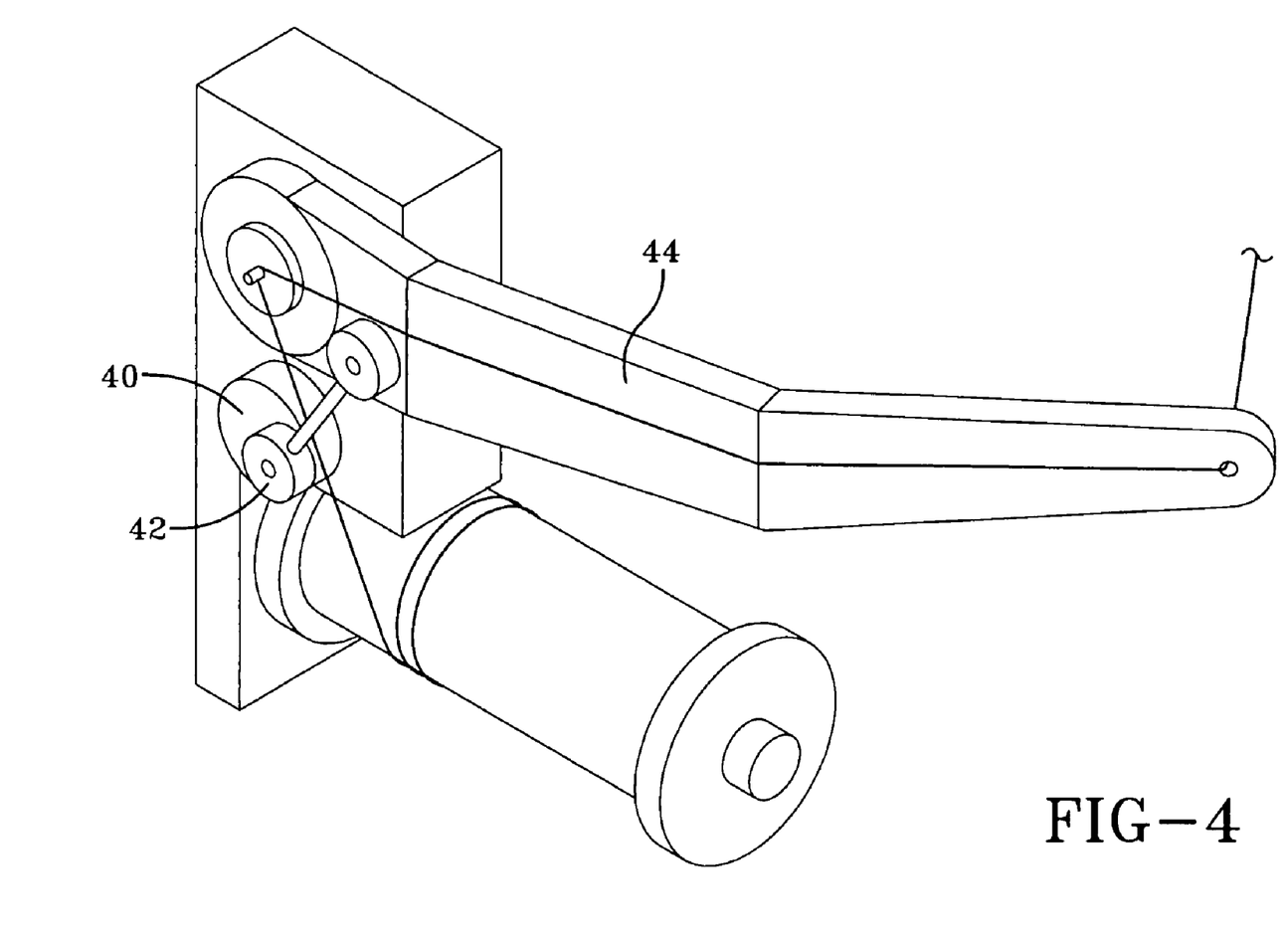
FIG. 4 is a perspective schematic view illustrating detail of an exemplary rotary braiding machine.

Advantageously, the particular braid pattern combination desired may be selected to optimize various properties of the hose assembly 10, such as burst strength, volumetric expansion, dynamic life, or coupleability. The desired braid pattern may be selected by adjusting a cam on the rotary braiding machine used to form the reinforcing layers 14, 22. Referring to FIG. 4 for example, in the rotary braiding machine disclosed in U.S. Pat. No. 5,099,744, a cam 40 and cam follower 42 control the motion of a pivotable arm 44 such that an end of the arm moves up and down to form the over-under patterns in the braid. To create the varied braid patterns, a small cam can be substituted for cam 40 when it is desired to form a 1-over, 1-under pattern. Similarly, a larger cam may be substituted when it is desired to form a 3-over, 3-under or 4-over, 4-under braid pattern. Accordingly, the cams are relatively easily changed to alter the braid pattern formed by the machine, whereby the same machine may be utilized to create various braid patterns as discussed above.

Figure 5:
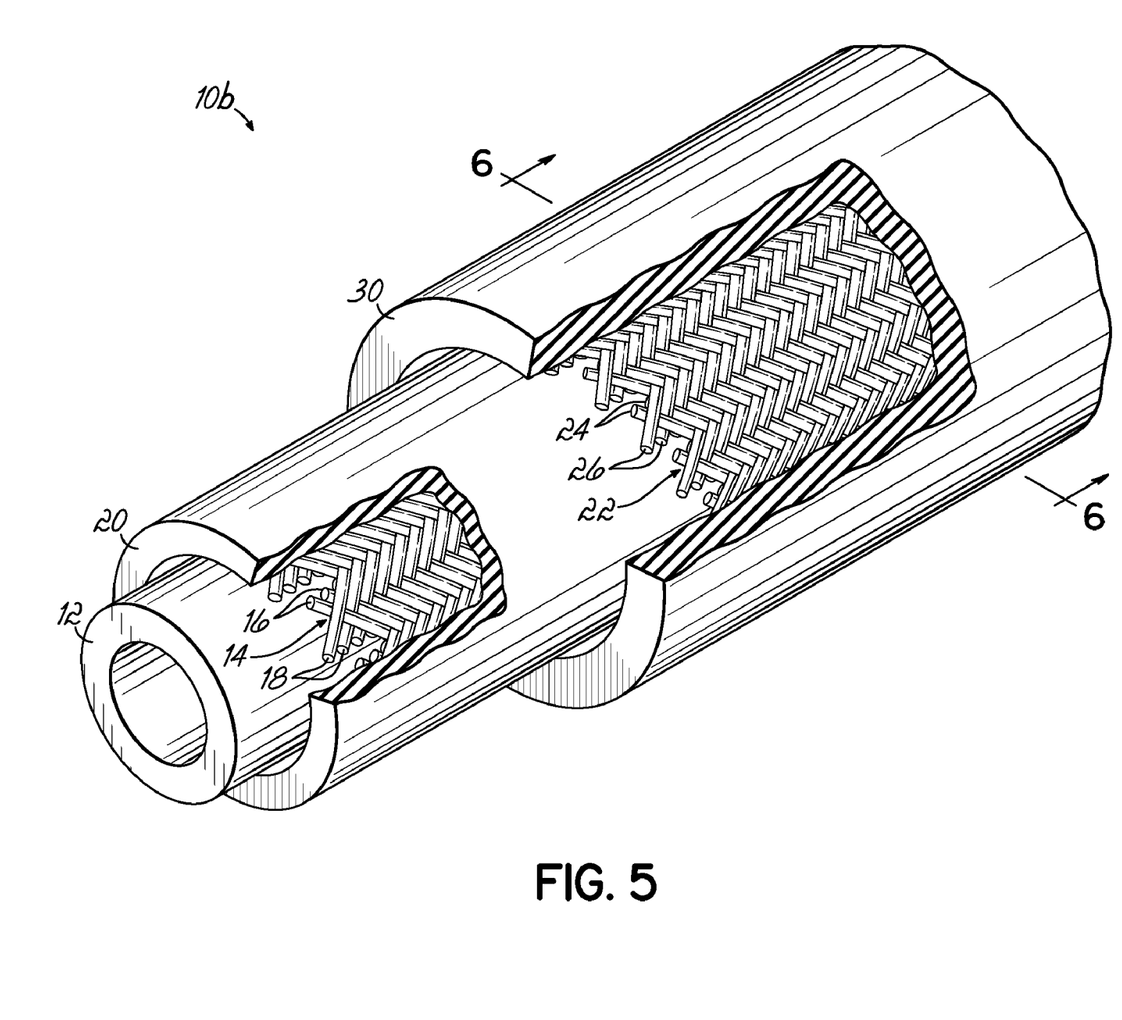
FIG. 5 is a perspective view depicting an exemplary hose assembly according to yet another embodiment.
Figure 6:
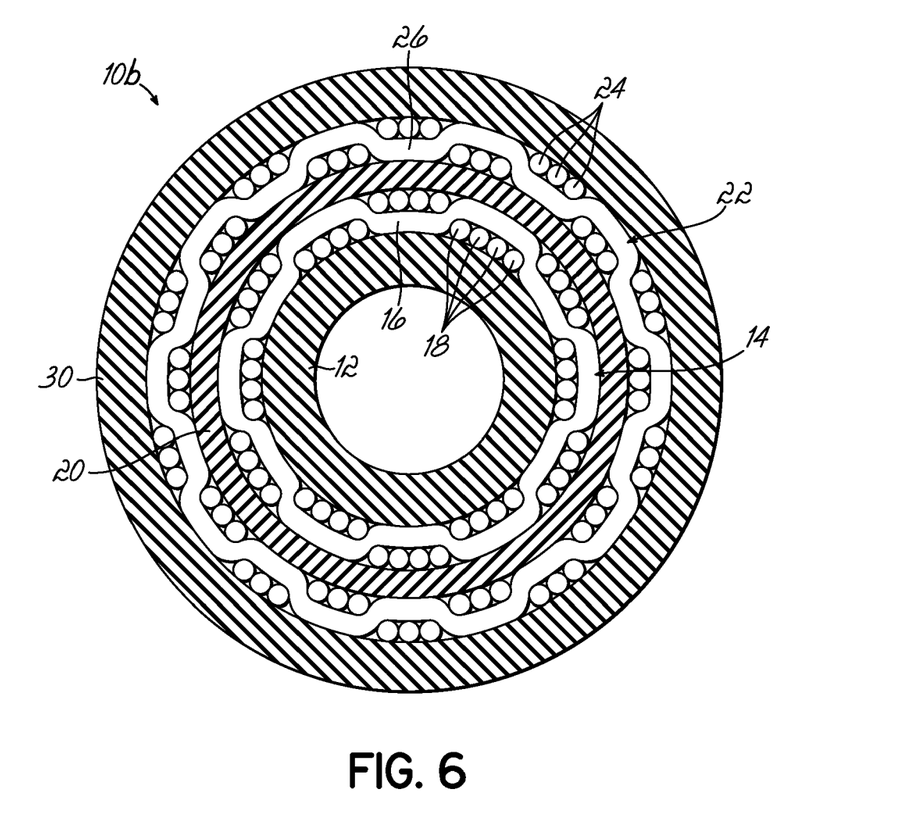
FIG. 6 is a cross-sectional view of the hose assembly of FIG. 5, taken along line 6-6.

Particular combinations of braid patterns may produce hose assemblies with superior, unexpected properties. For example, FIGS. 5-6 illustrate a hose assembly 10*b* wherein the first reinforcing layer 14 has a 4-over, 4-under braid pattern and the second reinforcing layer 22 has a 3-over, 3-under braid pattern. Thus, each first reinforcing member 16 passes successively over and under four of the oppositely wound second reinforcing members 18. Adjacent ones of the first reinforcing members 16 in this embodiment do not pass over the same four ones of the second reinforcing members 18.

Figure 5A:
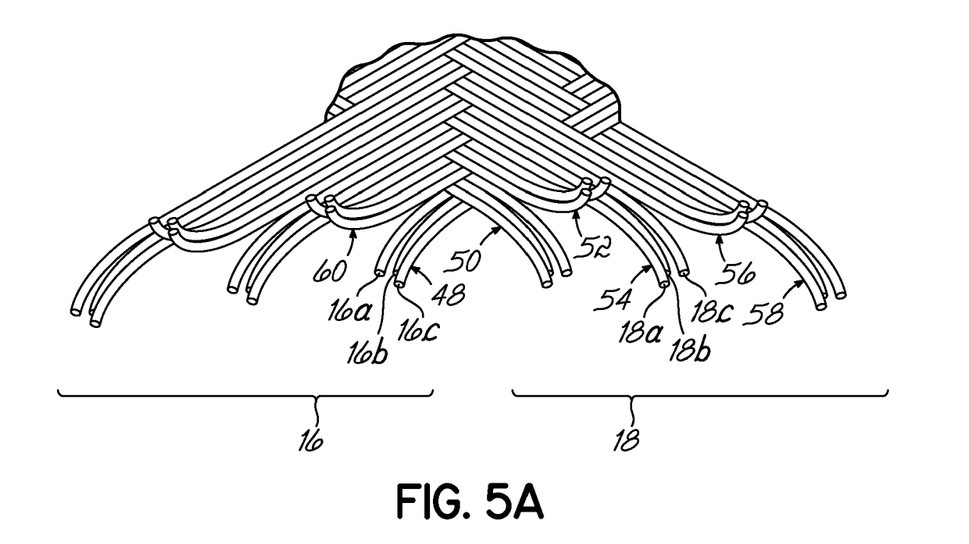
FIG. 5A is an alternative embodiment of an exemplary hose assembly similar the hose assembly of FIG. 5.

To this end, FIG. 5A illustrates one of the first reinforcing members 16, generally designated by reference number 48, passing under first, second, third, and fourth ones of the second reinforcing members 18, generally designated by reference numbers 50, 52, 54, and 56, respectively. An adjacent one of the first reinforcing members 16, generally designated by reference number 60, then passes under second, third, fourth, and fifth ones 52, 54, 56, 58 of the second reinforcing members 18. Adjacent first reinforcing members 16 thus change from passing over to under the second reinforcing members, or from passing under to over the second reinforcing members 18, between different pairs of the second reinforcing members 18. FIG. 4A also illustrates that similar to the embodiment shown in FIG. 1A, the first and second reinforcing members 16, 18 may each comprise a plurality of individual strands 16*a*, 16*b*, 16*c* or 18*a*, 18*b*, 18*c*.

Applicant has found that by providing the hose assembly 10*b* with a 4-over, 4-under braid pattern in the first reinforcing layer 14 and a 3-over, 3-under braid pattern in the second reinforcing layer 22, superior flow properties may be achieved when compared to conventional hoses designed to meet the same performance criteria. In particular, the hose assembly 10*b* may have a larger internal diameter when compared to a conventional hose having a 2-over, 2-under braid pattern and substantially the same outer diameter. For example, when the first and second reinforcing members 16, 18 are constructed from polyvinyl alcohol and the outer diameter of the hose assembly 10*b* is from about 0.394" (10.00 mm) to about 0.433" (11.00 mm), the hose assembly 10*b* may have an internal diameter of about 5/32" (3.96 mm) with dynamic life and volumetric expansion properties equivalent or superior to conventional brake hoses having a comparable outer diameter with a 2-over, 2-under braid pattern in both reinforcing layers and about a 1/8" (3.18 mm) internal diameter. The larger internal diameter allows for increased flow of brake fluid through the hose assembly 10*b*, particularly at lower temperatures, thereby increasing the response time of the braking system. Thus, stopping distances may be reduced and the overall feel when operating the brake pedal may be improved.

An increase in internal diameter typically increases the volumetric expansion of a hose. By using the braid pattern described above for the hose assembly 10*b*, however, volumetric expansion can be kept at levels comparable to, or even less than, those associated with conventional hoses having 2-over, 2-under braid patterns. Each reinforcing member 16, 18, 24, 26 has less "cross-over" points (defined where the reinforcing member crosses over or under the oppositely-wound reinforcing member in the same reinforcing layer) in the braid pattern of the hose assembly 10b when compared to a conventional 2-over, 2-under braid pattern. As a result, each reinforcing member 16, 18, 24, 26 is shorter in length and stretches less (when compared to reinforcing members in a 2-over, 2-under pattern), thereby controlling volumetric expansion.

Figure 7:
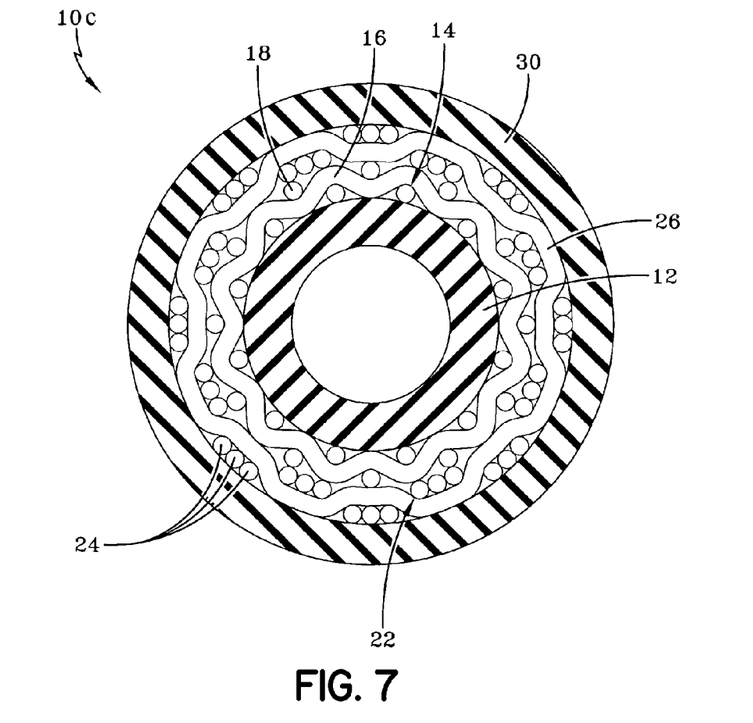
FIG. 7 is a perspective view depicting another embodiment of a hose assembly according to the present invention.
Figure 8:
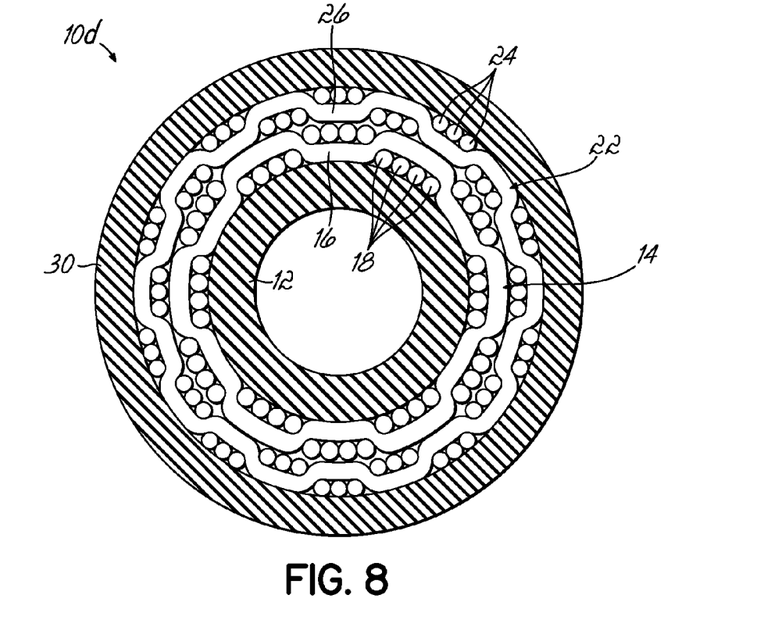
FIG. 8 is a perspective view depicting yet another embodiment of a hose assembly according to the present invention.

In other embodiments, hose assemblies may be formed as described above without an intermediate layer between the first and second reinforcing layers. For example, FIG. 7 depicts a hose assembly 10c having the same braid pattern as the hose assembly 10 (FIG. 2) and FIG. 8 depicts a hose assembly 10d having the same braid pattern as the hose assembly 10b (FIG. 6). In these embodiments, the second reinforcing layer 22 is formed directly over the first reinforcing layer 14. Alternatively, an adhesive (not shown) may be applied over the first reinforcing layer 14 prior to forming the second reinforcing layer 22 over the first reinforcing layer 14.

According to another aspect of the invention, a method of making a hydraulic brake hose assembly 10 comprises forming a core hose layer 12, selectively braiding a first reinforcing layer 14 over the core hose layer 12 in one of a 1-over, 1-under pattern; a 2-over, 2-under pattern; a 3-over, 3-under pattern; or a 4-over, 4-under pattern. An intermediate hose layer 20 is formed over the first reinforcing layer 14, and a second reinforcing layer 22 is selectively braided over the intermediate hose layer 20 in one of a 1-over, 1-under pattern; a 2-over, 2-under pattern; a 3-over, 3-under pattern; and a 4-over, 4-under pattern. Finally, an outer hose layer 30 may be formed over the second reinforcing layer 22 to complete the hose assembly 10.

Example

A hose assembly having the same design as the hose assembly 10b was constructed with about a 3.962 mm (0.156") internal diameter and about a 10.67 mm (0.42") outer diameter. A series of tests were conducted according to SAE J140, section 4.2.3 standards on the hose assembly. To this end, the hose assembly was mounted vertically between two fittings on a testing apparatus. The testing apparatus placed one end of the hose in selective fluid communication (by a valve) with a source of testing fluid for applying pressures and the other end of the hose assembly in selective fluid communication (by a valve) with a graduated buret for measuring volumes of liquid.

After allowing the testing fluid to flow through the hose assembly and into the buret to bleed air from the system, the valve to the buret was closed and about 20.0 MPa (2900 psi) was applied to the hose assembly using the testing fluid. The pressure in the hose assembly was then released and the fluid level in the buret was adjusted to zero. Next, with the valve to the buret closed, about 6.9 MPa (1000 psi) was applied to the hose assembly. The hose assembly was then sealed off from the source of testing fluid within about 2 to about 8 seconds. Then, within about 3 seconds, the valve to the buret was opened for about 10 to about 13 seconds to allow the testing fluid in the expanded hose to rise into the buret. These steps were repeated twice so that the amount of testing fluid in the buret was the total of the three expansions. The volume of the testing fluid in the buret was then used to determine the volumetric expansion at 6.9 MPa (1000 psi).

The above procedure was repeated to obtain the volumetric expansion at pressures of about 10.3 MPa (1500 psi) and about 20.0 MPa (2900 psi). Additionally, for comparison, the test procedure was conducted on a Goodyear 5052 hydraulic brake hose, which has about a 3.30 mm (0.130") internal diameter, a comparable outer diameter, and the conventional 2-over, 2-under braid pattern in first and second reinforcing layers. As seen from the table below, the hose with the alternative braid pattern was unexpectedly found to have a lower volumetric expansion at the tested pressures despite having a larger internal diameter.

TABLE 1

| Results from SAE J1401, Section 4.2.3 Tests | | |
|---|---|---|
| Pressure (psi) | Hose with alternative braid pattern Volumetric Expansion (cc/ft) | Goodyear 5052 hose Volumetric Expansion (cc/ft) |
| 1000 | 0.08 | 0.0975 |
| 1500 | 0.115 | 0.13 |
| 2900 | 0.265 | 0.295 |

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. A hydraulic brake hose, comprising:
a core hose layer;
a first reinforcing layer over said core hose layer, said first reinforcing layer having a braid pattern formed in a 4-over, 4-under pattern;
a second reinforcing layer over said first reinforcing layer, said second reinforcing layer having a braid pattern formed in a 3-over, 3-under pattern; and
an outer hose layer over said second reinforcing layer;
wherein said 4-over, 4-under pattern includes first and second reinforcing members braided such that each of said first reinforcing members crosses over four oppositely wound second reinforcing members, then passes under four adjacent, oppositely wound second reinforcing members in succession; and
said 3-over, 3-under pattern includes first and second reinforcing members braided such that each of said first reinforcing members crosses over three oppositely wound second reinforcing members, then passes under three adjacent, oppositely wound second reinforcing members in succession.

2. The hydraulic brake hose of claim 1, wherein each of said first reinforcing members is braided to contact adjacent ones of said first reinforcing members in its respective layer that are wound in the same direction.

3. The hydraulic brake hose of claim 2, wherein each of said second reinforcing members is braided to contact adjacent ones of said second reinforcing members in its respective layer that are wound in the same direction.

4. The hydraulic brake hose of claim 1, wherein said first reinforcing layer is formed from a fiber material or a metallic wire material.

5. The hydraulic brake hose of claim 1, wherein said second reinforcing layer is formed from a fiber material or a metallic wire material.

6. The hydraulic brake hose of claim 1, wherein at least one of said first and second reinforcing layers comprises reinforcing members formed from a plurality of strands of reinforcing material.

7. The hydraulic brake hose of claim 1, further comprising:
an intermediate hose layer formed between said first and second reinforcing layers.

8. The hydraulic brake hose of claim 1, further comprising:
an adhesive disposed between said first and second reinforcing layers.

9. The hydraulic brake hose of claim 1, further comprising:
an intermediate hose layer formed between said first and second reinforcing layers.

10. The hydraulic brake hose of claim 9, wherein each of said first reinforcing members is braided to contact adjacent ones of said first reinforcing members in its respective layer that are wound in the same direction.

11. The hydraulic brake hose of claim 10, wherein each of said second reinforcing members is braided to contact adjacent ones of said second reinforcing members in its respective layer that are wound in the same direction.

12. A hydraulic brake hose, comprising:
a core hose layer having an internal diameter of about 5/32";
a first reinforcing layer over said core hose layer, said first reinforcing layer having a braid pattern formed in a 4-over, 4-under pattern;
a second reinforcing layer over said first reinforcing layer, said second reinforcing layer having a braid pattern formed in a 3-over, 3-under pattern; and
an outer hose layer over said second reinforcing layer, said outer hose layer having an outer diameter from about 0.396" to about 0.433";
wherein said 4-over, 4-under pattern includes first and second reinforcing members braided such that each of said first reinforcing members crosses over four oppositely wound second reinforcing members, then passes under four adjacent, oppositely wound second reinforcing members in succession; and
said 3-over, 3-under pattern includes first and second reinforcing members braided such that each of said first reinforcing members crosses over three oppositely wound second reinforcing members, then passes under three adjacent, oppositely wound second reinforcing members in succession;
wherein said hydraulic brake hose has a volumetric expansion less than about 0.0975 cc/ft at 1000 psi.

13. The hydraulic brake hose of claim 12, wherein said hydraulic brake hose has a volumetric expansion less than about 0.13 cc/ft at 1500 psi.

14. The hydraulic brake hose of claim 13, wherein said hydraulic brake hose has a volumetric expansion less than about 0.295 cc/ft at 2900 psi.

15. The hydraulic brake hose of claim 12, wherein said hydraulic brake hose has a volumetric expansion of about 0.08 cc/ft at 1000 psi.

16. The hydraulic brake hose of claim 15, wherein said hydraulic brake hose has a volumetric expansion of about 0.115 cc/ft at 1500 psi and about 0.265 cc/ft at 2900 psi.

17. The hydraulic brake hose of claim 12, wherein at least one of said first and second reinforcing layers comprises reinforcing members formed from a plurality of strands of reinforcing material.

18. The hydraulic brake hose of claim 12, wherein said outer hose layer has an outer diameter of about 0.42".

19. The hydraulic brake hose of claim 13, wherein said hydraulic brake hose has a volumetric expansion less than about 0.13 cc/ft at 1500 psi and less than about 0.295 cc/ft at 2900 psi.

20. The hydraulic brake hose of claim 12, wherein said hydraulic brake hose has a volumetric expansion of about 0.08 cc/ft at 1000 psi, about 0.115 cc/ft at 1500 psi, and about 0.265 cc/ft at 2900 psi.

* * * * *